(12) United States Patent
Kralik et al.

(10) Patent No.: US 7,187,497 B2
(45) Date of Patent: Mar. 6, 2007

(54) POLARIZATION INSENSITIVE OPTICAL SWITCHING AND ROUTING SYSTEMS AND METHODS OF MANUFACTURING AND OPERATION (75) Inventors: John C. Kralik, Devon, PA (US); Thomas W. Stone, Hellertown, PA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 336 days.

(21) Appl. No.: 10/668,975

(22) Filed: Sep. 23, 2003

(65) Prior Publication Data
US 2005/0063056 A1    Mar. 24, 2005

(51) Int. Cl.
*G02B 27/28* (2006.01)
*G02B 5/30* (2006.01)

(52) U.S. Cl. ............... 359/484; 359/485; 359/495; 359/496; 385/11; 385/16; 385/24

(58) Field of Classification Search ........ 359/483–485, 359/494–497, 15; 385/16–17, 11, 24
See application file for complete search history.

(56) References Cited

U.S. PATENT DOCUMENTS

| | | | |
|---|---|---|---|
| 5,122,895 A | | 6/1992 | Takanashi et al. |
| 5,272,550 A | * | 12/1993 | Dickson et al. ............. 359/3 |
| 5,619,352 A | | 4/1997 | Koch et al. |
| 5,771,320 A | | 6/1998 | Stone |
| 5,844,717 A | | 12/1998 | Faris |
| 5,877,876 A | * | 3/1999 | Birdwell ............... 349/39 |
| 5,886,816 A | | 3/1999 | Faris |
| 5,926,241 A | | 7/1999 | Gunning, III |
| 5,943,168 A | | 8/1999 | Reinsch |
| 5,946,116 A | * | 8/1999 | Wu et al. .................. 398/55 |
| 6,072,923 A | * | 6/2000 | Stone ....................... 385/16 |
| 6,285,473 B1 | * | 9/2001 | Nishi et al. ............... 359/15 |
| 6,373,630 B1 | | 4/2002 | Lee et al. |
| 6,411,437 B1 | | 6/2002 | Cannon et al. |

OTHER PUBLICATIONS

Gooch, C. H. and Tarry, H.A. (1975). The optical properties of twisted nematic liquid crystal structures with twist angles less than or equal to 90 degrees. J. Phys. D: Appl. Phys. (8) 1575-1584.

* cited by examiner

Primary Examiner—Leonidas Boutsikaris (57) ABSTRACT

Polarization converter assemblies are utilized to provide switching and routing systems with effective coupling between a first and second router assemblies, and to provide polarization insensitive switching and routing systems. An improved optical switching/routing system of this invention includes a first router assembly, a second router assembly and a polarization converter assembly, each assembly optically aligned with one another, the polarization converter assembly being optically interposed between the first router assembly and the second router assembly. Embodiments of the polarization converter include, but are not limited to, liquid crystal spatial light modulators or half-wave retarders. A polarization insensitive switching and routing system of this invention includes a polarization separating sub-system, a selectable switching/routing sub-system, and a polarization combining sub-system. In one embodiment, the polarization separating sub-system includes a polarization splitter and a patterned polarization converter and the polarization combining sub-system includes a patterned polarization converter and a polarization combiner.

7 Claims, 8 Drawing Sheets

POLARIZATION INSENSITIVE OPTICAL SWITCHING AND ROUTING SYSTEMS AND METHODS OF MANUFACTURING AND OPERATION

STATEMENT REGARDING FEDERALLY SPONSORED RESEARCH OR DEVELOPMENT

This invention was made partially with U.S. Government support from the U.S. Air Force under Contract No. F30602-98-C-0079. The U.S. Government has certain rights in the invention.

FIELD OF THE INVENTION

The present invention relates generally to interconnection and switching systems, and, more particularly, to optical switching/routing (interconnecting) systems which incorporate the use of selectable switching and routing components.

BACKGROUND OF THE INVENTION

With the advent of substantial new uses for high bandwidth digital and analog optical systems, there exists a greater need to effectively control the route of optical beams from among many possible paths. This is especially true in digital computing systems where signals must be routed among processors, in analog systems such as phased array radar, and in the switching of high bandwidth optical carriers in communication systems. However, it should be realized that these are just several of numerous systems that require the use of an optical switching or routing mechanism.

In many current and future systems light beams are modulated in a digital and/or analog fashion and are used as "optical carriers" of information. There are many reasons why light beams or optical carriers are preferred in these applications. For example, as the data rate required of such channels increases, the high optical frequencies provide a tremendous improvement in available bandwidth over conventional electrical channels such as formed by wires and coaxial cables. In addition, the energy required to drive and carry high bandwidth signals can be reduced at optical frequencies. Further, optical channels, even those propagating in free space (without waveguides such as optical fibers) can be packed closely and even intersect in space with greatly reduced crosstalk between channels. Finally, operations that are difficult to perform in the lower (e.g., radio) frequencies such as time shifting for phased array applications can often be performed more efficiently and compactly using optical carriers.

A common problem encountered in applications in which high data rate information is modulated on optical carrier beams is the switching of the optical carriers from among an array of channels. These differing optical channels may represent, for example, routes to different processors, receiver locations, or antenna element modules. One approach to accomplish this switching is to extract the information from the optical carrier, use conventional electronic switches, and then re-modulate an optical carrier in the desired channel. However, from noise, space, and cost perspectives it is more desirable to directly switch the route of the optical carrier from the input channel to the desired channel, without converting to and from the electronic (or microwave) regimes.

Another common problem arises in applications where there is a need to arbitrarily interconnect any of n electronic input channels to any of n output channels. This "crossbar switch" type of function is difficult to implement electronically. In such a case better performance may be obtained by modulating the electronic information on optical carriers, and switching the optical carriers to the desired channel where they may be reconverted to electronic information if desired. This conversion to optical carriers permits the use of optical switching techniques as in the present invention, as well as providing a ready interface to other optical interconnect schemes.

Another problem that is typical in optical switching systems is the insertion loss they impose. Some switching systems divide the input signal power into many parts, and block (absorb) the ones that are not desired. Others use switches that are inefficient and absorb or divert a significant part of the input signal.

The optical switching and routing systems of U.S. Pat. No. 5,771,320 (issued to T. W. Stone on Jun. 23, 1998), incorporated by reference herein, overcame some of the problems associated with complexity and performance, including number of required switching devices and control signals, switch isolation, noise and crosstalk suppression, insertion loss, spurious reflections, data skew, and compactness that were present in preceding optical switching systems.

One optical switching and routing system described in U.S. Pat. No. 5,771,320 utilizes a pair of router assemblies made up of a series of switchable diffraction gratings. The second router assembly is crossed in orientation with respect to the first router assembly. In one embodiment, the switchable diffraction gratings are polarization selective gratings. Such switchable polarization selective gratings typically transmit light of a first polarization in both the switched states and diffract light of a second distinct polarization in one switched state, and transmit light of the second distinct polarization in the other switched state.

In the type of switching and routing systems utilizing switchable polarization selective gratings, there is a need for improved coupling between the first and second router assemblies.

Further, in the type of switching and routing systems utilizing switchable polarization selective gratings, there is also a need for polarization insensitive switching and routing systems.

It is one object of this invention to provide polarization selective switching and routing systems with effective coupling between the first and second router assemblies.

It is another object of this invention to provide systems and methods for polarization insensitive switching and routing.

It is yet another object of this invention to provide optical systems and methods that can be utilized in polarization insensitive switching and routing systems.

BRIEF SUMMARY OF THE INVENTION

The objects set forth above as well as further and other objects and advantages of the present invention are achieved by the embodiments of the invention described hereinbelow and set out in the claims appended hereto.

The systems of present invention utilize polarization converter assemblies to provide switching and routing systems with effective coupling between a first and second router assemblies, and to provide polarization insensitive switching and routing systems.

An improved optical switching/routing system of this invention includes a first router assembly, a second router assembly and a polarization converter assembly, each assembly optically aligned with one another, the polarization converter assembly being optically interposed between the first router assembly and the second router assembly. Embodiments of the polarization converter include, but are not limited to, liquid crystal spatial light modulators or half-wave retarders.

The polarization insensitive switching and routing system of this invention includes a polarization separating sub-system, a selectable switching/routing sub-system, and a polarization combining sub-system. In one embodiment, the polarization separating sub-system includes a polarization splitter and a patterned polarization converter and the polarization combining sub-system includes a patterned polarization converter and a polarization combiner.

An embodiment of the polarization separating sub-system of this invention includes a polarizing beam-splitter and a patterned polarization converter. The polarization converter has an isotropic region and a second region. A substantially collimated optical beam with arbitrary polarization state incident on the beam-splitter will exit as two beams with parallel polarization vectors. Anisotropic crystalline materials, such the "walk-off polarizer" offered by Optics for Research, Inc. of Caldwell, N.J., can be utilized for the polarizing beam-splitter. Possible embodiments of the second region of the polarization converter are, but not limited thereto, a half-wave retarder and a twisted nematic configuration.

Another embodiment of the polarization separating sub-system of this invention includes a pair of polarization splitting gratings and a patterned polarization converter.

An embodiment of the polarization combining sub-system of this invention includes a patterned polarization converter and an anisotropic crystalline material acting as a combiner. Another embodiment of the polarization combining sub-system of this invention includes a patterned polarization converter and a pair of polarization combining gratings.

A method for fabricating an embodiment of the polarization converter is also disclosed.

For a better understanding of the present invention, together with other and further objects thereof, reference is made to the accompanying drawings and detailed description and its scope will be pointed out in the appended claims.

BRIEF DESCRIPTION OF THE SEVERAL VIEWS OF THE DRAWINGS

FIG. 6b is a side view of the schematic representation of an embodiment of the polarization converting system of FIG. 6a;

DETAILED DESCRIPTION OF THE PREFERRED EMBODIMENTS

In order to better understand the present invention described below, it should be noted that certain terms used in the description of the invention have been used interchangeably.

In the following descriptions of the present invention, the terms such as "light" and "optical radiation" may be used interchangeably, and these terms both include electromagnetic radiation over the entire spectrum of wavelengths such as, for example, ultraviolet, visible, and infrared. Also, the term "optical", for example, as applied to components and systems, refers not only to optical components and systems, but also to electro-optical components and systems.

Furthermore, terms such as "beams" and "channels" may also be interchanged, in certain instances, based upon their usage as recognized in the art.

The optical switching/routing systems of this invention utilize polarization converter assemblies to provide switching and routing systems with effective coupling between a first and second router assemblies, and to provide polarization insensitive switching and routing systems.

Figure 1:
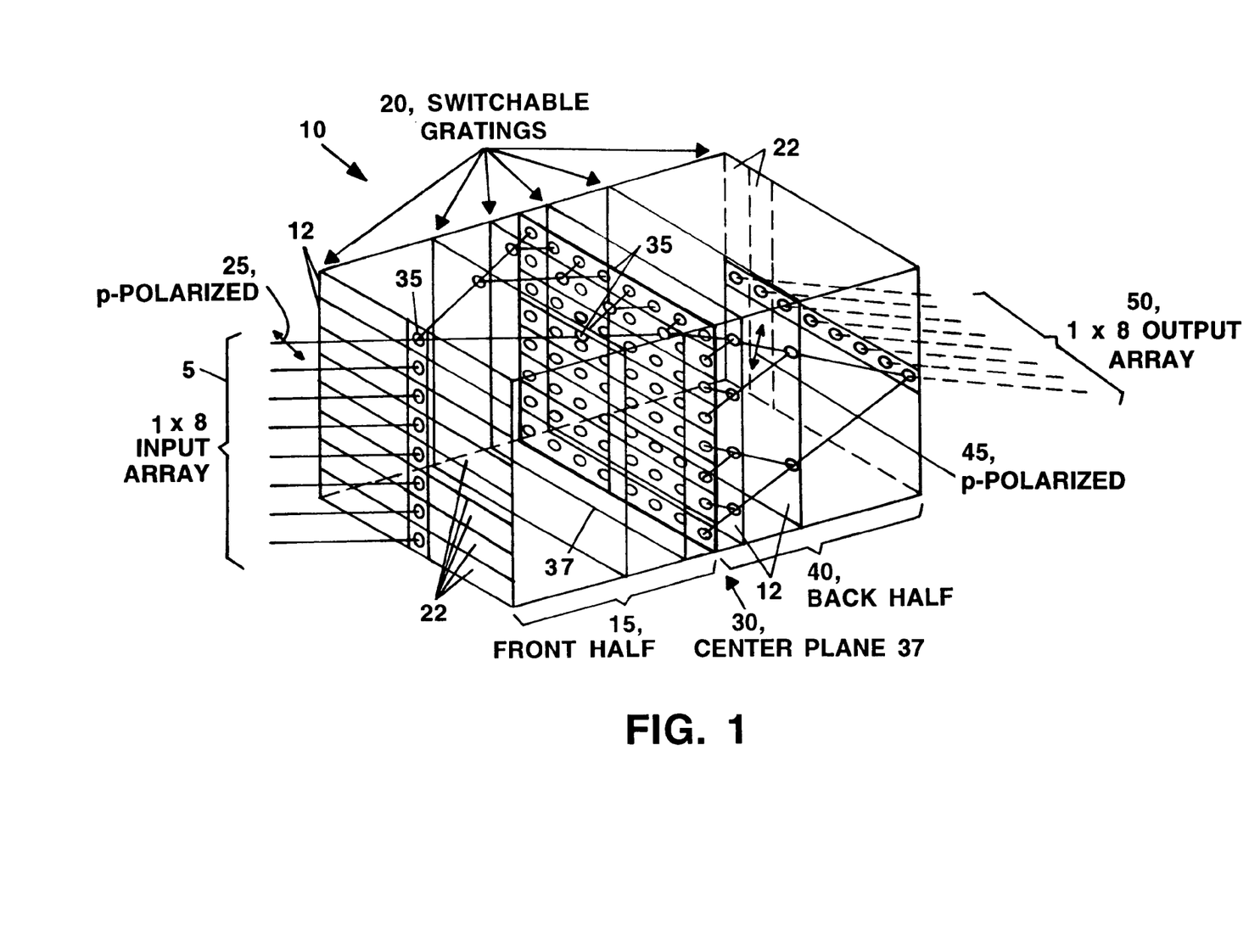
FIG. 1 is a pictorial, schematic representation of an embodiment of the optical switching/routing system of this invention.

FIG. 1 depicts a schematic representation of an embodiment of an optical switching/routing system 10 of this invention with effective coupling between first and second router assemblies (front half and back half) 15, 40. Referring to FIG. 1, the first router assembly 15 is capable of receiving one or more individual beams 5 of electromagnetic radiation with polarization in a predetermined plane of polarization 25. The first router assembly 15 has a predetermined orientation and includes grating means 20 defining several independently controlled segments for directing the one or more individual beams 5 of electromagnetic radiation from pre-selected locations 35 along the segments for input into a polarization converter assembly 30. The polarization converter assembly 30 is capable of receiving the one or more individual beams 5 of electromagnetic radiation from pre-selected locations 35 along the segments 20 of the first router assembly 15, and of rotating the predetermined plane of ploarization 25 to produce an output plane of polarization 45. The second router assembly 40 being has an orientation different from the predetermined orientation of the first router assembly 15. The second router assembly 40 includes grating means 20 defining several independently controlled segments for receiving each of the individual beams 5 from the polarization converter assembly 30 and directing the individual beams 5 for output 50.

Embodiments of the router assemblies are described in U.S. Pat. No. 5,771,320, incorporated by reference herein. The gratings 20 are switchable gratings and the switching is controlled by control signals 12 (only two of which are shown). The gratings are separately switchable in segments 22 for each of the channels in the input array 5. This independent switching of each of the gratings 20 for each input channel can be accomplished by pixellating each of the gratings 20 into m stripe segments 22. In the embodiment shown in FIG. 1, the second router assembly 40, which is nearly identical in structure the first router assembly 15, is crossed in orientation with respect to the first router assembly 15. The segments 22 of the second router assembly 40 are rotated 90 degrees with respect to the segments 22 of the first router assembly 15.

During operation of the switching and routing system 10 of FIG. 1, control signals 12 effect the "on-off" operation of the gratings 20, thereby directing the input beams 5 of each channel to the desired output channels of output array 50. The first router assembly 15 contains n cascaded gratings 20, each of which is pixilated into m separately controllable segments 22. Thus there are n*m control signals 12 required to independently route each of the input beams 5 to its selected column in the central plane 37. The second router assembly 40 also needs m*n control signals 12 to route the selected beam from each column to the desired output channel. The total control line count for a general m channel to m channel switch for this embodiment is thus 2*m*n.

The embodiments of the optical switching and routing systems described in U.S. Pat. No. 5,771,320 utilize volume phase diffraction gratings that permit switching of the incident energy between two or more orders. The primary mechanisms considered which permit this diffracted-order switching are electrical switching, optical switching, and polarization switching. The switched gratings can be optically switched, electrically switched, polarization switched, or switched based on other mechanisms. Currently it is preferred that electrical and polarization switching techniques are used with the present invention since they are extremely fast (switching times in the microsecond regime or faster). Electrical switching can be obtained in materials such as Polaroid DMP-1 28 photopolymer imbibed with nematic liquid crystals or, for example, polymer dispersed liquid crystals. The gratings formed utilizing polymer dispersed liquid crystals or photopolymer imbibed with nematic liquid crystals are polarization sensitive gratings.

Referring again to FIG. 1, during operation of the optical switching and routing system 10 of this invention utilizing polarization sensitive gratings, control signals 19 effect the "on-off" operation of the gratings 20. Input beams 5 of electromagnetic radiation with polarization in a predetermined plane of ploarization 25 are steered by the enabled segments 22 of gratings 20 to preselected locations on the output plane 37 of the first router assembly 15. When a particular grating segment 22 is "on," the beam incident on that segment is completely switched by diffraction with little or no loss from the incident beam to a diffracted beam traveling in a new direction. The steered beams 5 from the preselected locations on the output plane 37 of the first router assembly 15 are inputs to the polarization converter assembly 30. The polarization converter assembly 30 rotates the predetermined plane of ploarization 25 into an output plane of polarization 45. The output plane of polarization 45 is chosen so that the beams 5 are effectively transmitted by the second router assembly 40. The beams 5 of electromagnetic radiation with polarization in an output plane of polarization 45 are steered by the enabled segments 22 of gratings 20 in the second router assembly 40 to an output location in output array 50.

Figure 2:
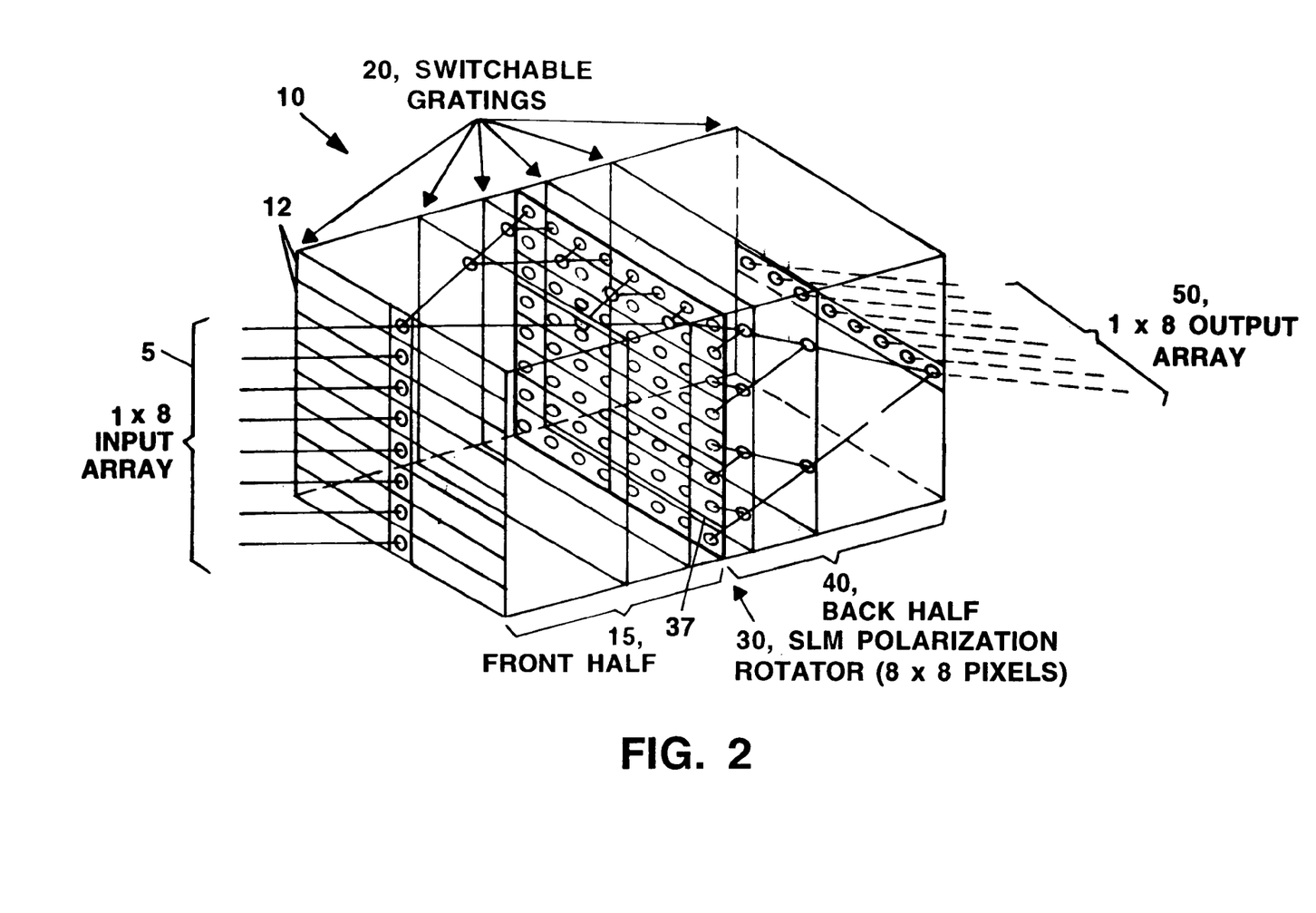
FIG. 2 is a pictorial, schematic representation of another embodiment of an optical switching/routing system of this invention.

FIG. 2 is a schematic representation of an embodiment of the optical switching/routing system of FIG. 1 in which the polarization converter 30 includes a liquid crystal spatial light modulator (SLM). In this embodiment, the SLM has two states. In one state, an SLM pixel rotates the polarization plane by 90°; in the other state, the polarization plane is not rotated. Exemplary embodiments are 2-D SLMs based on ferroelectric liquid crystals (such as those available from Displaytech), or SLMs based on nematic liquid crystals (such as those available from Meadowlark Optics). Other embodiments include an SLM based on a twisted nematic configuration. The SLM polarization converter 60 also includes steering gratings directly before and directly after the central plane SLM. In one embodiment, a first steering grating, disposed between the output plane 37 and the SLM, would steer beams 5 normal to the output plane 37 of the first router assembly 15. The second steering grating, disposed after the SLM, would steer the beams 5 in the input vertical plane of the second router assembly 40. The first steering grating ensures normal (perpendicular) incidence of the beams 5 onto the SLM. The steering gratings may be pixilated static gratings or switchable gratings.

Figure 3:
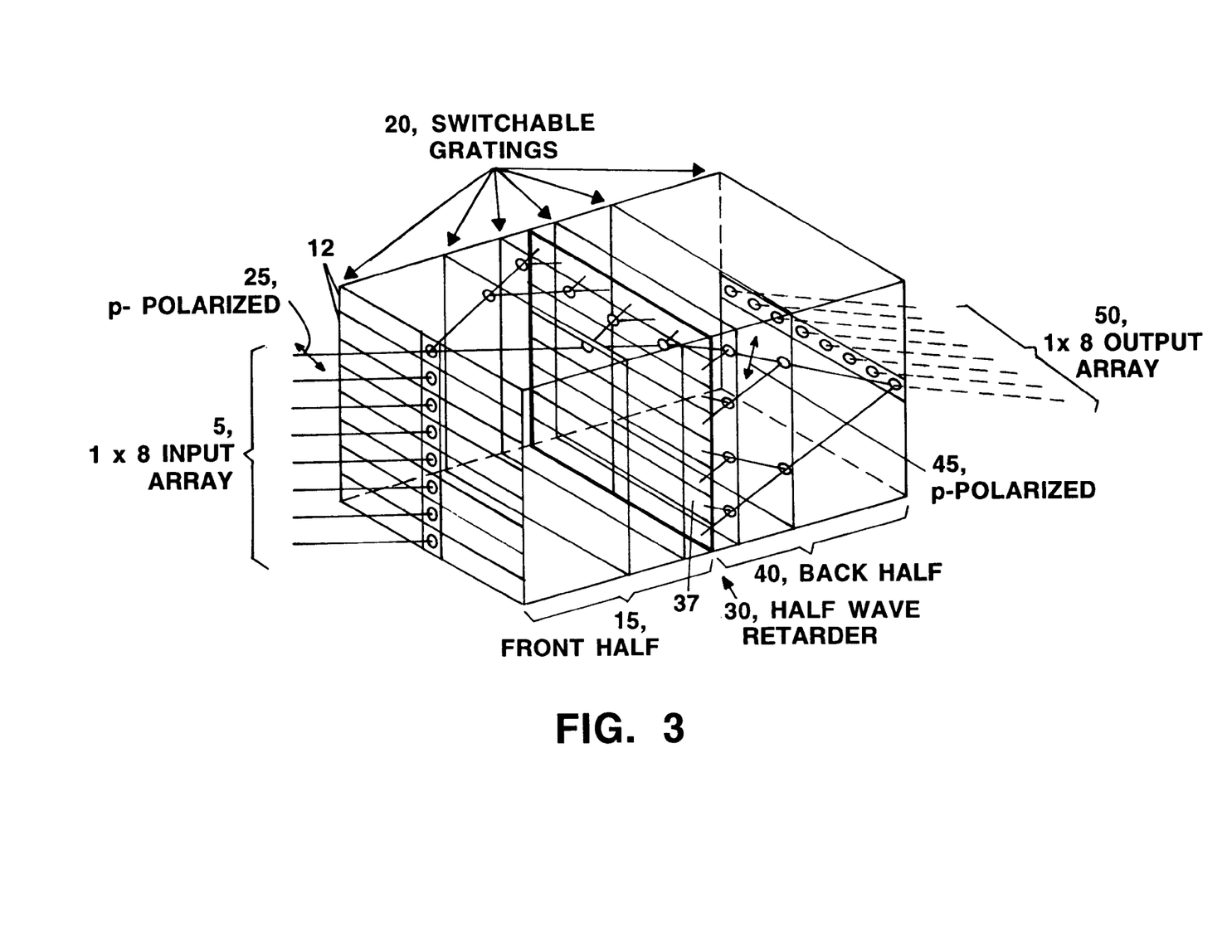
FIG. 3 is a pictorial, schematic representation of yet another embodiment of an optical switching/routing system of this invention.

FIG. 3 is a schematic representation of an embodiment of the optical switching/routing system of FIG. 1 in which the polarization converter 30 includes a half-wave retarder. In this embodiment, the polarization converter 70 includes a zero-order half-wave retarder that has its optic axis in a plane parallel to the output plane 37 of the first router assembly 15. The optic axis is oriented at 45° with respect to the polarization plane 25 of the incident beams. The polarization converter 70 also includes steering gratings directly before and directly after the central plane half-wave retarder. In one embodiment, a first steering grating, disposed between the output plane 37 and the half-wave retarder, would steer beams 5 normal to the output plane 37 of the first router assembly 15. The second steering grating, disposed after the half-wave retarder, would steer the beams 5 in the input vertical plane of the second router assembly 40. The first steering grating ensures normal (perpendicular) incidence of the beams 5 onto the half-wave retarder.

In one embodiment, half-wave retarders are comprised of anisotropic materials. In another embodiment, the half-wave retarder utilizes a solid twisted nematic film in the central plane. Such a solid twisted nematic film could include, but are not limited to, polymerizable nematic, or chiral nematic, liquid crystals. (Examples of half-wave retarders can be found in the products offered by Meadowlark Optics and Newport Research Corporation.) Other embodiments of half-wave retarders are within the scope of this invention.

Figure 4:
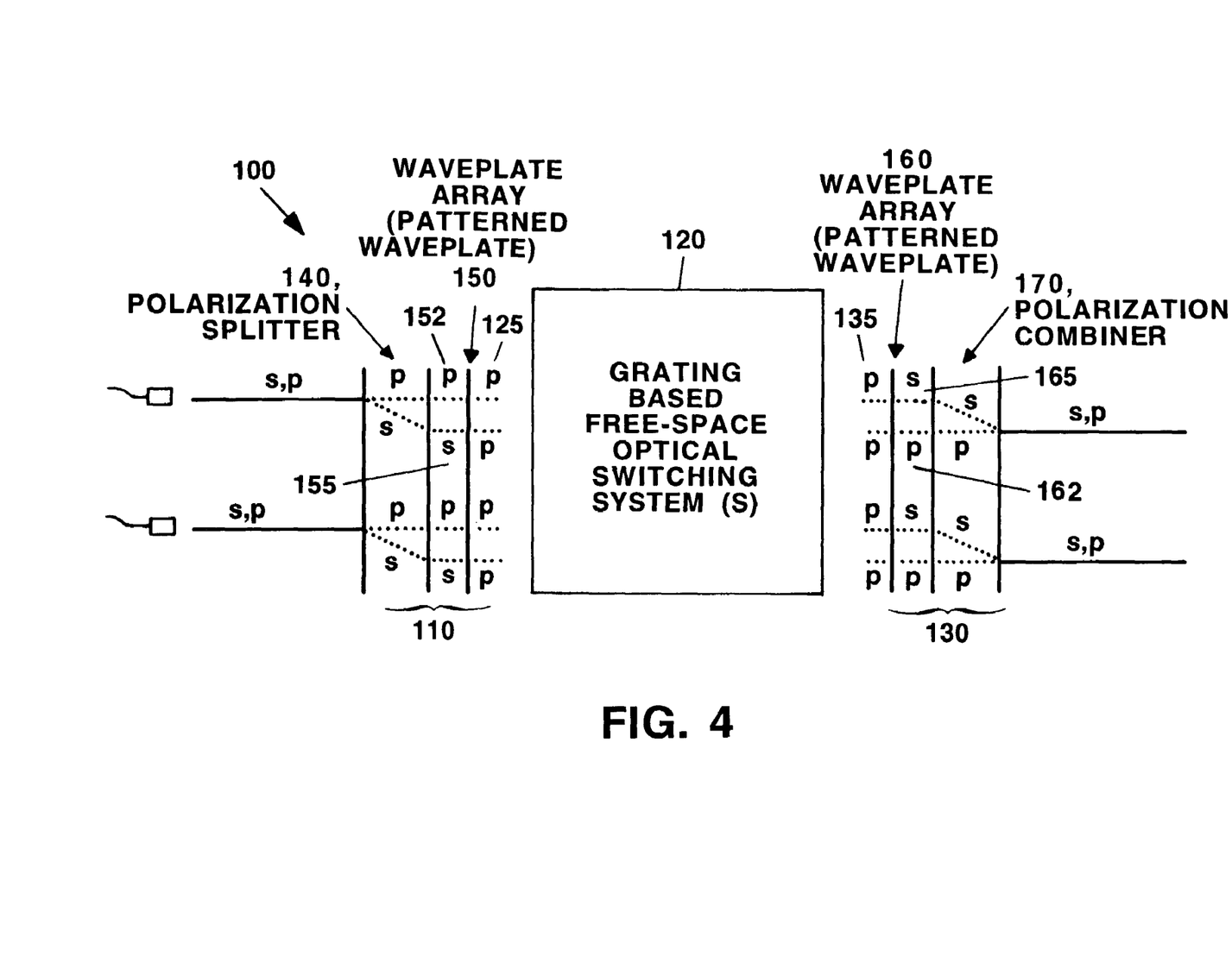
FIG. 4 is a schematic representation of an embodiment of a polarization insensitive optical switching/routing system of this invention.
Figure 5:
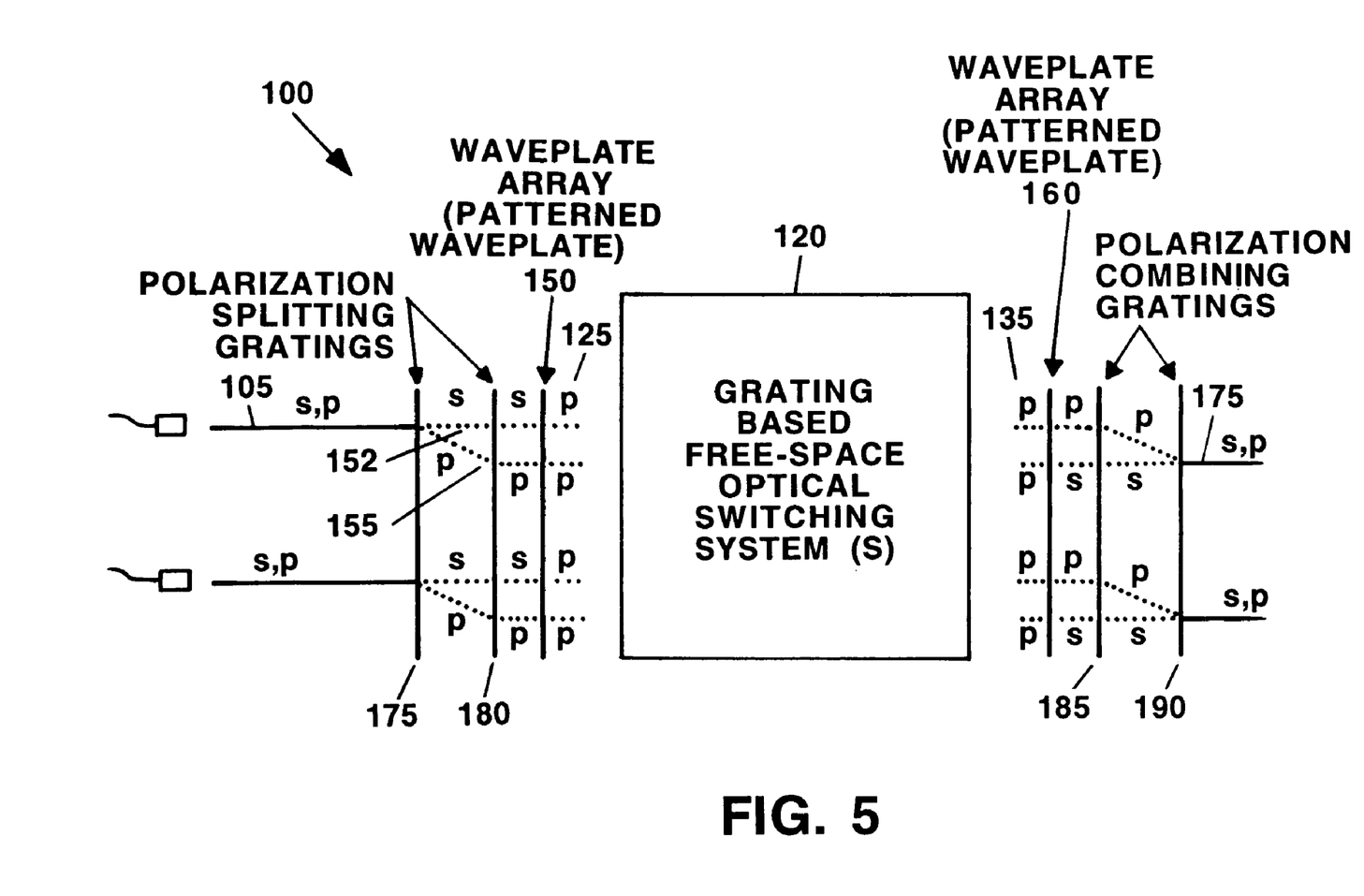
FIG. 5 is a schematic representation of another embodiment of the polarization insensitive optical switching/routing system of this invention.

A schematic representation of an embodiment of a polarization insensitive optical switching/routing system 100 of this invention is shown in FIG. 4. Referring to FIGS. 4 and 5, the polarization components are, as is usually done, defined with respect to the local interface. In an embodiment of the grating based switching/routing system shown in FIGS. 1, 2, and 3, if a pair of beams with "p" polarization constitute the input channel to the grating based switching/routing system, where the gratings diffract "p" polarized light when the gratings are "on", the polarization of the output channel of the first router assembly 15 is rotated ninety (90) degrees by the polarization converter assembly 30 and provided as input to the second router assembly 40. In this embodiment, the gratings (segments) of the second router assembly 40 are rotated 90 degrees with respect to the segments of the first router assembly 15. Since the gratings in the second router assembly 40 diffract "p" polarized light when the gratings are "on" and the polarization components are defined locally with respect to the grating, the polarization component of the output channels of the second router assembly 40 will be labeled as a "p" component although the polarization component of the output channels is rotated by 90 degrees with respect to the polarization component of the input channels to the first router assembly 15.

Referring to FIG. 4, the polarization insensitive optical switching/routing system 100 includes a polarization separating sub-system 110, a selectable switching/routing sub-system 120, and a polarization recombining sub-system 130. The polarization separating sub-system 110 includes a polarization splitter 140 and a patterned polarization converter 150. ("Patterned" as used herein includes a "tiled" polarization converter. A "tiled" polarization converter is one that has assembled from sub-units or components.) The patterned polarization converter 150 has an isotropic region 152 and a second region 155 such that an optical beam 105 with arbitrary polarization state incident on the polarization splitter 140 will exit the patterned polarization converter 150 as two beams with parallel polarization vectors 125.

The polarization recombining sub-system 130 includes a patterned polarization converter 160 and a polarization combiner 170. The patterned polarization converter 160 has an isotropic region 162 and a second region 165 such that two beams with parallel polarization vectors 135 incident on the patterned polarization converter 160 will exit the polarization combiner 170 as an optical beam 175 with arbitrary polarization state.

If selectable switching/routing sub-system 120 includes polarization sensitive gratings, the gratings operate on one component of polarization (labeled "p" in FIG. 4). In order to make the switching/routing system 120 function with the other component of polarization (labeled "s" in FIG. 4) or with light containing both components of polarization, the switching systems are placed between symmetric polarization splitter 110 and combiner 130 assemblies as shown in FIG. 4. Although "p" and "s" are used herein as polarization labels, it should be noted that "p" and "s", and "ordinary" and "extraordinary", as used herein refer to exemplary polarization labels and the methods of this invention are not limited to these exemplary cases. It should also be noted that the methods of this invention can be applied to, but are not limited to, orthogonal polarization components.

During operation of the system of FIG. 4, an optical beam 105 with arbitrary polarization state is incident on the polarization splitter 140. In one embodiment, the polarization splitter 140 includes a uniaxial crystal such as calcite, quartz, etc. The thickness of the splitter 140 is selected so that the s and p components are spatially separated into a pair of twin beams. The twin beams then encounter the patterned polarization converter 150 that rotates the s component beam into the p-polarized state. In one embodiment, the pattern is selected so as to leave the p-polarized beam in the p state. The two p-polarized twin beams 125 corresponding to each input beam 105 then propagate through the switching/routing system 120, and are routed accordingly. In one embodiment, the patterned polarization converter 150, 160 includes a polymerized twisted nematic rotator.

At the output of the switching/routing system 120, the exiting twin beams 135 are then symmetrically recombined. In order to balance path lengths of the two component beams, the patterned polarization converter 160 is now aligned so that the beam that was transmitted through the splitter (undeviated) at the front of the system is now deviated symmetrically as shown in FIG. 4. The thickness of the combiner 170 is chosen so that the two polarization component beams 162, 165 are brought back together again and are spatially combined in an output optical beam 175 with arbitrary polarization state.

In another embodiment of the a polarization insensitive optical switching/routing system 100, shown in FIG. 5, polarization sensitive gratings 175, 180, 185, 190 are used to accomplish the split and combine functions. The polarization sensitive gratings 175, 180 are used to split and separate the s and p polarization components into twin, spatially separated beams 152, 155 as in FIG. 4. And as in FIG. 4, a patterned polarization converter 150 produces two p-polarized twin beams 125 corresponding to each input beam 105. The two p-polarized twin beams 125 corresponding to each input beam 105 then propagate through the switching/routing system 120, and are routed accordingly. At the output of the switching/routing system 120, the exiting twin beams 135 are then symmetrically recombined. The patterned polarization converter 160 operates as in FIG. 4. The polarization sensitive gratings 185, 190 spatially combine the two polarization component beams 162, 165 into the output optical beam 175 with combined (arbitrary) polarization state. Also as in FIG. 4, the recombination is symmetric so as to balance the path lengths of the two twin polarization component beams.

In one embodiment of the polarization insensitive optical switching/routing system 100, the optical switching/routing system of FIG. 1 is utilized as the selectable switching/routing sub-system 120. In the embodiment of this invention in which the switching/routing system 120 includes a pixilated switchable grating, such as that shown in FIG. 1, the two p-polarized twin beams 125 are typically switched/routed together (in tandem) in the same manner a single beam (channel) is switched through the switching/routing system 120.

It should be noted that the polarization separating/recombining sub-systems could be considered as a separate optical systems (also referred to as a polarization diversity filters). The polarization sensitive grating based polarization diversity filters (PDF) have cost advantages (in particular at large aperture). Multi channel capabilities (for example, a single large aperture grating can accept many parallel input channels) absent in prior art splitters, such as anisotropic and micro-optic polarization beam splitters, can be achieved in polarization sensitive grating based PDFs. Since only two components are required and these two components are readily alignable, the polarization sensitive grating based PDFs have alignment advantages over multi-element PDFs such as micro-optic polarization beam splitters.

In one embodiment, shown in FIG. 5, a pair of identical polarization sensitive volume holographic diffraction gratings 175, 180, such as described in U.S. Pat. Nos. 5,771,320, and 5,692,077, or made with PDLC, with a photo-polymer such as Polaroid DMP-128, or with dichromated gelatin, which diffract only "p" polarized light and transmits "s" polarized light are used as polarization splitting gratings. The first grating diffracts the "p" polarized light while the "s" polarized light is transmitted undiffracted.

The second grating subsequently diffracts the "p" component in order to render it parallel to the undiffracted "s" polarization component. The separation between the two gratings is sufficient to spatially separate the "s" and "p" component beams. It should be noted that the diffraction angle (and accordingly the spatial frequency) of the two grating can be chosen to optimize the contrast in the polarization splitting.

For the polarization sensitive grating shown in FIG. 5, the diffraction efficiency of the "p" polarization is maximized and the diffraction efficiency for "s" polarization is simultaneously minimized (thus, the "s" polarized beam is transmitted). It should be noted that in another embodiment (not shown), the "s" polarization is maximized and the diffraction efficiency for "p" polarization is simultaneously minimized. The polarization combining performed by the polarization combining gratings 185, 190 is symmetrical to the operation of the polarization splitting gratings 175, 180. The embodiment shown in FIG. 5 results in an optical path balanced system and substantially reduces the temporal chromatic dispersion effects.

Figure 6A:
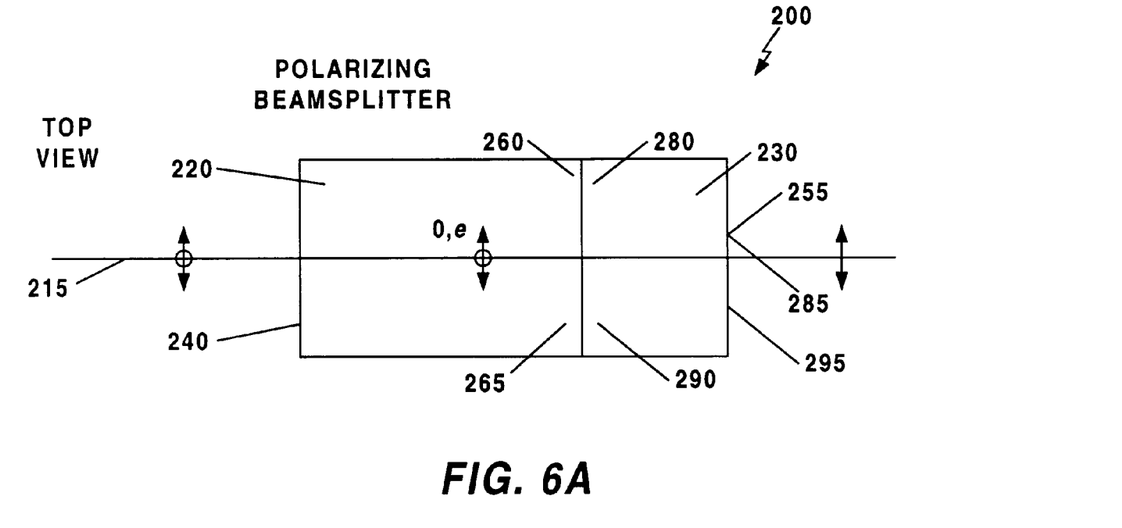
FIG. 6a is a top view of a schematic representation of an embodiment of a polarization converting system of this invention.
Figure 6B:
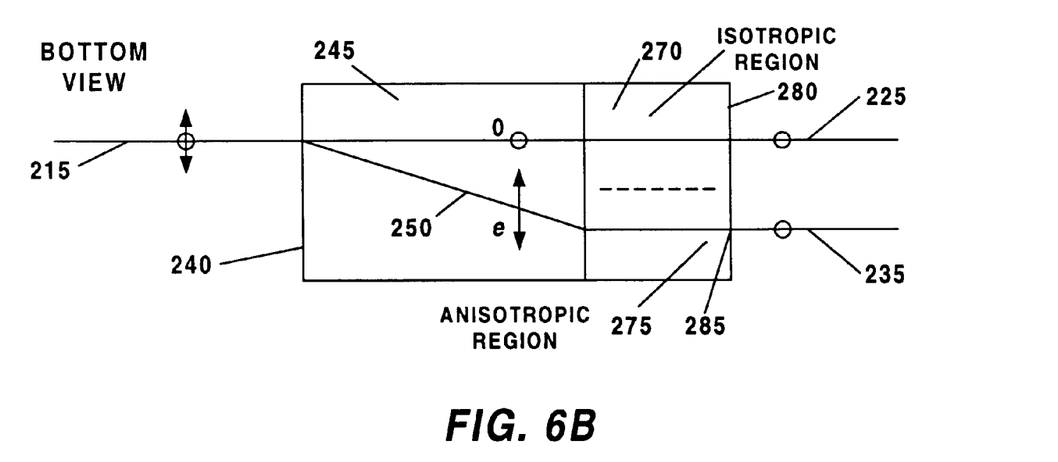

A schematic representation of an embodiment of a polarization converting system 200 (patterned polarization converter) of this invention, which can be utilized as the patterned polarization converter 150, 160 of FIGS. 4, 5, is shown in FIGS. 6a, 6b. A detailed description of the polarization converting system 200 and methods for fabricating one embodiment are given herein below. Referring to FIGS. 6a and 6b, the polarization converting system 200 of this invention includes a polarizing beam-splitter 220 and a patterned polarization converter 230, both of which are more fully described below. During use, as seen in FIGS. 6a and 6b, a substantially collimated optical beam 215 with arbitrary polarization state is incident on the system 200 through the beam-splitter light receiving surface 240 and exits as two beams 225, 235 with parallel polarization vectors, as shown in FIGS. 6a and 6b. The beam-splitter light emitting surface 255 has two areas—a first area 260 and a second area 265. The polarization beam-splitter separates the received beam of light 215 into a beam of light 245 of a first polarization (also called the ordinary polarization) emitted from the first area 260 and another beam of light 250 of a second polarization (also called the extraordinary polarization) emitted from the second area 265.

In one embodiment, the polarization converter 230 of this invention has a first isotropic region 270 and a second region 275. When a substantially collimated optical beam 215 with arbitrary polarization state is used as input to the polarizing beam-splitter 220, the beam of light of the first (the ordinary polarization) polarization 245 enters the isotropic region 270, at normal incidence, through the first region light receiving surface 280 and exits, as a beam 225 of the same first polarization, through the first region light emitting surface 285. Thus, transport through the isotropic region leaves the polarization unchanged. The output beam 225 has the same polarization as input beam 245.

The beam of light of the second (the extraordinary polarization) polarization 50 enters the second region 275, at normal incidence, through the second region light receiving surface 290 and exits, as a beam 235 of the first polarization, through the second region light emitting surface 295. Transport through the second region rotates the polarization of the incoming beam 250 producing an output beam 235 of the same polarization as the beam 225 emitted from the isotropic region. Both beams 225 and 235 exit the polarization converter 230 normal to the surface.

The first region light receiving surface 280 is substantially disposed on the first area 260 of the beam-splitter light emitting surface 255 by being in contact with or secured on area 260 by means of any conventional optically appropriate adhesive. The second region light receiving surface 290 is substantially disposed on the second area 265 of the beam-splitter light emitting surface 255 by also being in contact with or secured on area 265 by means of any conventional optically appropriate adhesive.

While the above embodiment is described in terms of a substantially collimated optical beam with arbitrary polarization state, containing both ordinary and extraordinary polarization components, incident on the beam-splitter light receiving surface, the embodiment could be also utilized for the case where the incident substantially collimated optical beam contains only ordinary or extraordinary polarization. In this case, one of the two beams entering the polarization converter has null amplitude and the same beam also has null amplitude upon exiting the polarization converter.

Although not limited thereto, anisotropic crystalline materials, such the "walk-off polarizer" offered by Optics for Research, Inc. of Caldwell, N.J., can be utilized for the polarizing beam-splitter. It should be noted that other configurations are possible utilizing one or more sub-elements. For example, micro-optic polarizing beam splitters (including polarizing cube beam splitters) can also be utilized.

In another embodiment of the polarization converting system of this invention, a pair of polarization sensitive gratings is used as the beam splitter.

Possible, but not limited to, embodiments of the second region 275 of polarization converter 230 are a half-wave retarder and a twisted nematic polarization converter. As shown in FIGS. 6a and 6b, the polarization converter 230 is utilized at normal incidence.

For a better understanding of the present invention, reference is now made of the following analysis. More specifically, bandwidth considerations can be used to compare the half-wave retarder and a twisted nematic embodiment. For linearly polarized light incident on a half-wave retarder with its plane of polarization at 45° with respect to the optic axis (of the retarder), the optical power $P_m$ still remaining polarized parallel with the incident light is given by $$P_m = \cos^2\left(\frac{m\pi}{2}\frac{\lambda_c}{\lambda}\right), \quad (1)$$

where, $\lambda_c$ is the center wavelength of the incident light, l is the wavelength of incident light and m is the order of the retarder, with m=1,3,5 . . . for zero-, first, second-order waveplates etc. Note that $\lambda_c=2\Delta nd$, where $\Delta n$ is the retarder birefringence and d is the retarder thickness. It is apparent from Eq. (1) that the zero-order half-wave retarder (i.e. m=1) has the broadest bandwidth. In addition, it is the least sensitive to angle of incidence variations. The extinction ratio, or contrast, of the retarder may be defined as follows:

$$\gamma_m = 10 \log P_m. \quad (2)$$

Next, consider the 90° twisted nematic (TN) polarization converter. The optical power at the output of a 90° TN with polarization plane parallel to that of the incident light is given by $$P_q = \frac{\sin^2\left[\frac{\pi}{2}\sqrt{1+\left(\frac{\lambda_c}{\lambda}\sqrt{4q^2-1}\right)^2}\right]}{1+\left(\frac{\lambda_c}{\lambda}\sqrt{4q^2-1}\right)^2}, \quad (3)$$

where $\lambda$ is the design wavelength and q is referred to as the order of the TN; q=1, 2, 3 . . . refer to first-, second-, third-minimum TNs etc (as shown by C. H. Gooch and H. A. Tarry, J. Appl. Phys. D 8, 1575 (1975)). The center wavelength of the TN rotator is given by $\lambda_c=2(\Delta nd)/(4q^2-1)$, where $\Delta n$ is the nematic birefringence and d is the TN film thickness. In the case of the TN, the first-minimum TN has the broadest spectral bandwidth. The extinction ratio, or contrast, of the TN is written analogously with Eq. (2).

Figure 7:
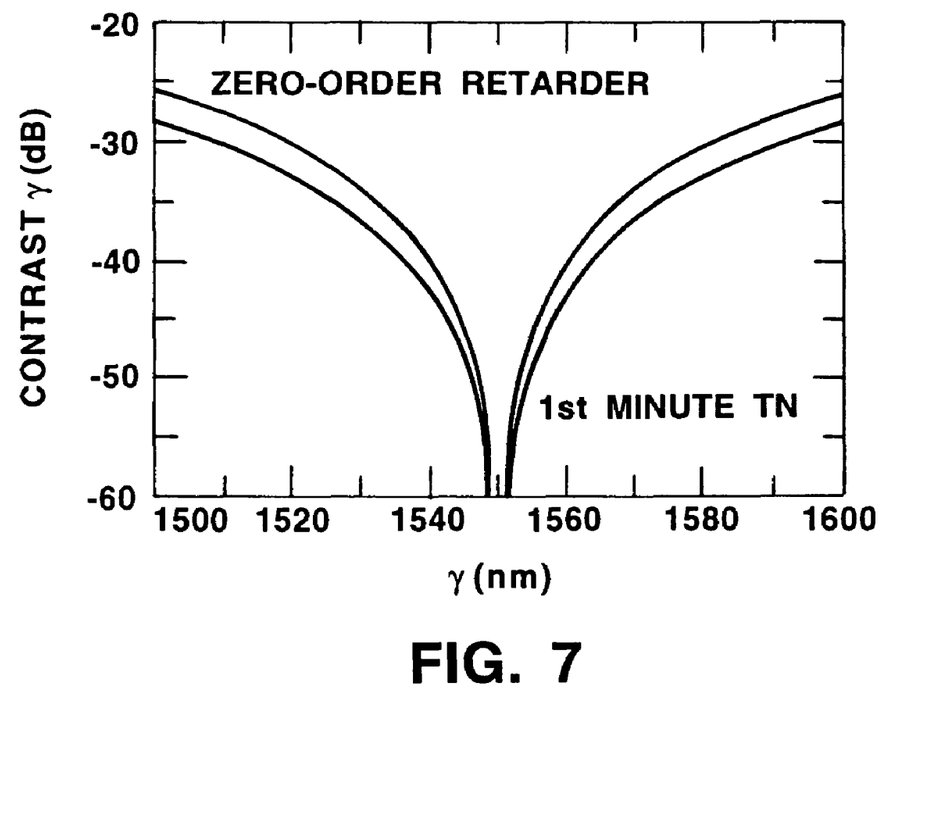
FIG. 7 is a graphical representation of a comparison of contrast for two embodiments of a polarization converter utilized in an embodiment of the polarization converting system of this invention.

FIG. 7 is a graphical representation of the contrast of the zero-order retarder and the first-minimum TN as a function of wavelength for $\lambda_c$=1550 nm. As can be seen from FIG. 7, the bandwidth of the first-minimum TN is broader than that of the zero-order retarder.

UV-curable nematic (N) or chiral nematic (N*), such as the RM (reactive mesogens) line of UV-curable nematics from EM Industries of Hawthorne, N.Y., could be used to construct the patterned polarization converter 230. The N material could be used to construct retarder-based rotators, and the N or N* material could be used to make the TN rotators.

Figure 8:
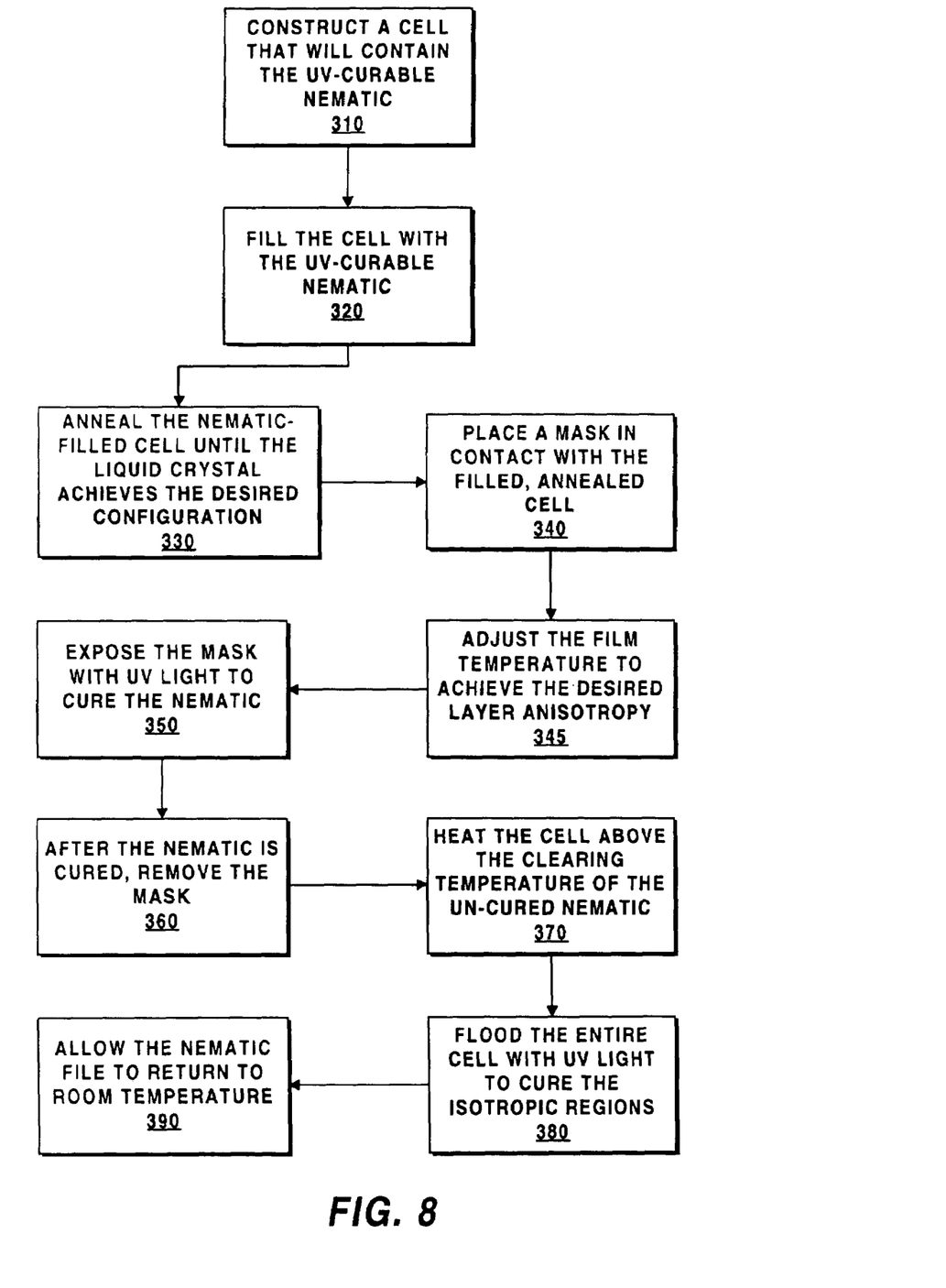
FIG. 8 is a flowchart of an embodiment of the method for fabricating a polarization converter of this invention.

FIG. 8 depicts a flowchart of an embodiment of the method for fabricating an embodiment of the polarization converter 230. Referring to FIG. 8, first, a cell (also referred to as a receptacle) is constructed to contain and align the UV-curable nematic (step 310, FIG. 8). The cell will generally consist of two substrates separated by appropriately sized spacers. The inner substrate surfaces will be coated with an alignment layer that aligns the nematic along a desired direction. In the case of the retarder, the alignment direction of the top and bottom substrates is the same; for the TN, the alignment directions of the top and bottom substrates are perpendicular. A suitable alignment layer that could be used is a polyimide film provided by Brewer Science (Rolla, Mo.) that contains mechanically-sculpted furrows to align the nematic directors. For example, polyimide SE812 (sold by Brewer Science) is spin-coated onto clean glass substrates to about 1-μm thickness, baked, then mechanically rubbed with a soft cloth. Nematic molecules align on such a polyimide layer, parallel to the rubbing direction.

Next, the cell is filled with the UV-curable nematic (step 320, FIG. 8). Filling may take place via capillary action; heating the cell may be necessary if the nematic materials are viscous. Alternatively, the nematic material may be heated on a single substrate that has spacers dispersed on it. A second substrate may be placed on top of this to create a nematic sandwich when the nematic is in the liquid state. Alternatively, the nematic may be solvent-cast onto a single substrate, as described, for example, in U.S. Pat. No. 5,926,241, issued to William J. Gunning, III on Jul. 20, 1999 (see, specifically, col. 6, lines 6–13).

The nematic-filled cell is annealed (step 330, FIG. 8) until the liquid crystal achieves the desired configuration dictated by the alignment layers on the substrates: e.g. planar or TN.

A mask is placed in contact with the filled, annealed cell so that the open areas define where the polarization rotation regions of the film shall be (step 340, FIG. 8). The film temperature is adjusted to achieve the desired layer anisotropy (step 345, FIG. 8), as determined using an optical measurement. In this step, the nematic birefringence Δn is thermally tuned after it is introduced into a cell with fixed thickness d. Note that the polarization state of an optical beam exiting the polarization converter depends on the quantity Δn·d/λ for both the half-wave retarder and twisted nematic configurations where λ is the wavelength of the optical beam.

The mask is, then, exposed with UV light that is effective for curing the nematic (step 350, FIG. 8). After the nematic is cured, the mask is removed (step 360, FIG. 8) and the cell is heated above the clearing temperature of the un-cured nematic (step 370, FIG. 8). The unexposed areas will then become isotropic; when this state has been achieved, the entire cell is flooded with UV light to cure the isotropic regions (step 380, FIG. 8). After exposure, the nematic film is allowed to return to room temperature (step 390, FIG. 8).

It should be noted that the although the above described embodiments have been described in terms of polarization rotation, other polarization conversion mechanisms are also within the scope of this invention. It should also be noted that although the embodiments of the polarization converter of this invention described above include a first isotropic region and a second polarization converting region, polarization converters including two polarization converting regions are also within the scope of this invention.

It should be further noticed that although the embodiment of the polarization insensitive switching/routing system of this invention described above includes a patterned polarization converter having an isotropic region and a polarization converting region, polarization insensitive switching/routing system including other polarization converters having two polarization converting regions are also within the scope of this invention.

An embodiment of a polarization insensitive switching/routing system of this invention including a polarization separating sub-system being capable of separating an input optical beam into a first optical beam of a first polarization and a second optical beam of a second polarization and emitting a first emitted optical beam of a third polarization and a second emitted optical beam of the third polarization, wherein the selectable switching/routing sub-system is capable of switching/routing the first emitted optical beam and the second emitted optical beam to an output channel of a fourth polarization, the output channel constituting a pair of output beams of said fourth polarization, and wherein the polarization recombining sub-system is capable of recombining the pair of output beams of the fourth polarization into a final output beam of combined polarization, is also within the scope of this invention. In such an embodiment, the polarization converters in either the polarization separating sub-system or the polarization recombining sub-system (or both) could include two polarization converting regions.

Although the invention has been described with respect to various embodiments, it should be realized this invention is also capable of a wide variety of further and other embodiments within the spirit and scope of the appended claims. For example, it should be noted that, although the invention is described above in terms of an embodiment where the two beams with parallel polarization vectors exiting the polarization converter have ordinary polarization, other embodiments are possible. For example, an embodiment in which the two beams with parallel polarization vectors exiting the polarization converter have extraordinary polarization is also possible.

What is claimed is:

1. An optical switching/routing system comprising:
a polarization separating sub-system;
said polarization separating sub-system being capable of separating an input optical beam into a first optical beam of a first polarization and a second optical beam of a second polarization, said second polarization being distinct from said first polarization, and emitting a first emitted optical beam of a third polarization and a second emitted optical beam of said third polarization, said emitted first and emitted second optical beams constituting an input channel of said third polarization;
a polarization recombining sub-system; and,
a grating based selectable switching/routing sub-system including at least one pixilated switchable component, said selectable switching and routing sub-system being interposed optically between said polarization separating sub-system and said polarization recombining sub-system; and said selectable switching/routing sub-system being capable of switching/routing said input channel to an output channel of a fourth polarization, said output channel constituting a pair of output beams of said fourth polarization;

said polarization recombining subsystem being capable of recombining said pair of output beams of said fourth polarization into a final output beam of combined polarization;

wherein said polarization separating sub-system comprises a polarization splitter and a patterned polarization converter; and wherein said polarization splitter comprises a pair of polarization splitting gratings.

2. An optical switching/routing system comprising:

a polarization separating sub-system;

said polarization separating sub-system being capable of separating an input optical beam into a first optical beam of a first polarization and a second optical beam of a second polarization, said second polarization being distinct from said first polarization, and emitting a first emitted optical beam of a third polarization and a second emitted optical beam of said third polarization, said emitted first and emitted second optical beams constituting an input channel of said third polarization;

a polarization recombining sub-system; and, a grating based selectable switching/routing sub-system including at least one pixilated switchable component, said selectable switching and routing sub-system being interposed optically between said polarization separating sub-system and said polarization recombining sub-system; and;

said selectable switching/routing sub-system being capable of switching/routing said input channel to an output channel of a fourth polarization, said output channel constituting a pair of output beams of said fourth polarization;

said polarization recombining subsystem being capable of recombining said pair of output beams of said fourth polarization into a final output beam of combined polarization;

wherein said polarization recombining sub-system comprises a patterned polarization converter and a polarization combiner; and wherein said polarization combiner comprises a pair of polarization combining gratings.

3. A polarization separating/combining system comprising:

a pair of polarization sensitive gratings;

a first grating of said pair of polarization sensitive gratings, when operating in the separating mode, being capable of receiving an input beam of electromagnetic radiation and separating said input beam of electromagnetic radiation into a first separated beam of a first polarization and a second separated beam of a second polarization;

a second grating of said pair of polarization sensitive gratings being optically aligned with said first grating to receive said first separated beam of a first polarization and said second separated beam of a second polarization and capable, when operating in the separating mode, of providing a first output beam of the first polarization and a second output beam of the second polarization;

when said pair of polarization sensitive gratings operates in the combining mode, said second grating being capable of receiving as an input a first input beam of the first polarization and a second input beam of the second polarization; and, said first grating being capable of providing as an output an output beam of combined polarization; and a patterned polarization converter optically aligned to receive said first output beam of a first polarization and said second output beam of a second polarization from said second grating of said pair of polarization sensitive gratings.

4. A polarization separating/combining system comprising:

a pair of polarization sensitive gratings;

a first grating of said pair of polarization sensitive gratings, when operating in the separating mode, being capable of receiving an input beam of electromagnetic radiation and separating said input beam of electromagnetic radiation into a first separated beam of a first polarization and a second separated beam of a second polarization;

a second grating of said pair of polarization sensitive gratings being optically aligned with said first grating to receive said first separated beam of a first polarization and said second separated beam of a second polarization and capable, when operating in the separating mode, of providing a first output beam of the first polarization and a second output beam of the second polarization;

when said pair of polarization sensitive gratings operates in the combining mode, said second grating being capable of receiving as an input a first input beam of the first polarization and a second input beam of the second polarization;

said first grating being capable of providing as an output an output beam of combined polarization; and a patterned polarization converter being capable of emitting a first emitted beam of a first polarization and a second emitted beam of a second polarization and being optically aligned to provide said first emitted beam and said second emitted beam to said second grating of said pair of polarization sensitive gratings.

5. The polarization separating/combining system of claim 3 wherein said patterned polarization converter is capable of emitting a first emitted beam of a third polarization and a second emitted beam of the third polarization.

6. The polarization separating/combining system of claim 3 wherein said patterned polarization converter comprises a polymerized twisted nematic rotator.

7. The polarization separating/combining system of claim 4 wherein said patterned polarization converter comprises a polymerized twisted nematic rotator.

* * * * *

UNITED STATES PATENT AND TRADEMARK OFFICE
CERTIFICATE OF CORRECTION

PATENT NO.       : 7,187,497 B2
APPLICATION NO.  : 10/668975
DATED            : March 6, 2007
INVENTOR(S)      : John Kralik It is certified that error appears in the above-identified patent and that said Letters Patent is hereby corrected as shown below:

(Column 12 Line 67) In Claim 1, after "and" delete ";" and insert -- , --, therefor.

(Column 13 Line 33) In Clam 2, after "and" delete ";" and insert -- , --, therefor.

Signed and Sealed this

Second Day of December, 2008

JON W. DUDAS
*Director of the United States Patent and Trademark Office*